MAGNETIC RECORDING MEMBERS

Filed June 17, 1969 3 Sheets-Sheet 1

MAGNETIC RECORDING MEMBERS

Filed June 17, 1969 3 Sheets-Sheet 3

United States Patent Office 3,554,798

Patented Jan. 12, 1971

3,554,798

MAGNETIC RECORDING MEMBERS

George Raymond Nacci, Wilmington, Del., assignor to E. I. du Pont de Nemours and Company, Wilmington, Del., a corporation of Delaware This is a continuation-in-part of 796,490, Feb. 4, 1969, which is a continuation-in-part of 682,234, Nov. 13, 1967, which is a continuation-in-part of 636,728, May 8, 1967 and 410,007, Nov. 9, 1964. This application is also a continuation-in-part of 636,955, May 8, 1967, as a continuation-in-part of said 410,007, Nov. 9, 1964, all but Ser. No. 796,490 being now abandoned. This application June 17, 1969, Ser. No. 834,121

Int. Cl. H01f *10/00*

U.S. Cl. 117—235 8 Claims

ABSTRACT OF THE DISCLOSURE

A magnetic recording member particularly adapted for use in thermomagnetic recording and copying having hard magnetic material such as $CrO_2$ discretely but regularly disposed in the surface of a transparent, usually plastic support. The magnetic material is discretely disposed in the form of three-dimensional "dots" and "lines" or other regular patterns to provide the essential transparency to light.

RELATED APPLICATIONS

This application is a continuation-in-part of S.N. 796,490 filed Feb. 4, 1969 which is a continuation-in-part of S.N. 682,234 filed Nov. 13, 1967, now abandoned, which is a continuation-in-part of applications S.N. 636,728 filed May 8, 1967, now abandoned and of S.N. 410,007 filed Nov. 9, 1964, now abandoned. This application is also a continuation-in-part of S.N. 636,955 filed May 8, 1967, now abandoned, as a continuation-in-part of said S.N. 410,007 filed Nov. 9, 1964, now abandoned.

FIELD OF THE INVENTION

This application relates to structured magnetic recording members particularly adapted for use in thermomagnetic recording.

In U.S. application 796,490 there is disclosed a process of thermomagnetic recording by contact reflex methods, suitable for use in office copying. For this purpose the magnetic recording member must provide for the transmission of light. At the same time, the magnetic material must be present in amounts sufficient to supply a useable magnetic field for read-out by treatment with magnetic pigments and the like. These requirements are mutually contradictory since the magnetic materials employed are generally highly opaque to the exposing light. The recording members of the present invention are directed to a solution of this problem and also offer other advantages for thermomagnetic recording including an enhanced magnetic field for the production of high quality printed images and mechanical durability.

SUMMARY OF THE INVENTION

The magnetic recording members of the present invention comprise a support transparent to light having a stratum composed of a plurality of discrete areas of hard magnetic particulate material held by the support and bound thereto, the area being arranged in a substantially regular pattern at a spacing of $1/100$ to $1/1500$ inch, the thermomagnetic recording members having a transmission to light of from 5% to 95% and preferably from 10% to 90%.

Preferably, the hard magnetic material is bound to the substrate by a plurality of discrete retaining means such as indentiations in the substrate film which are filled with the hard magnetic material mixed with sufficient hardenable binder to form a surface of magnetic material substantially coplanar with the surface of the substrate film. The depth of the magnetic material in the stratum can be from 0.05 to 2 mils and generally lies between 0.1 to 1.0 mils.

DESCRIPTION OF THE DRAWINGS

The invention will be understood in more detail from the description which follows and from the drawings, which are not in scale but throughout which the same element is represented by the same numeral, wherein:

FIG. 2 is a section along line 2—2 through FIG. 1 showing the magnetic material and binder 21 set in grooves 22 of substrate film 20;

In FIG. 11 there is shown a cross section of a recording member such as those described in FIGS. 1 to 10 in contact with a document during the process of irradiation with a flash of light substantially uniform over the surface of the recording member.

Figure 1:
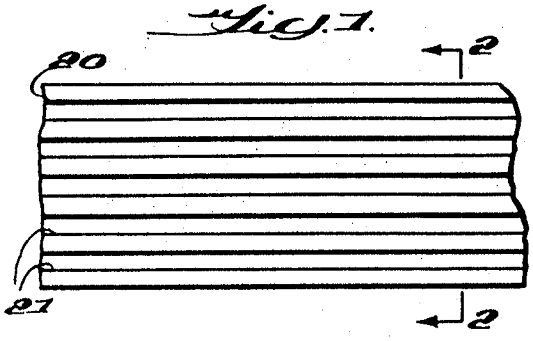
FIG. 1 is a view from above of a recording member consisting of a substrate plastic film 20 in which "lines" 21 of magnetic material are held within grooves (22.
Figure 2:
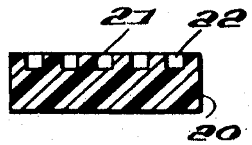
FIG. 2) in the film.
Figure 5:
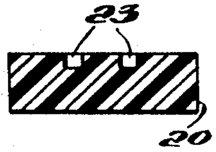
FIG. 5 is a reduced section along line 5—5 of FIG. 4 showing the holes 23 in which the dots 24 are set.
Figure 3:
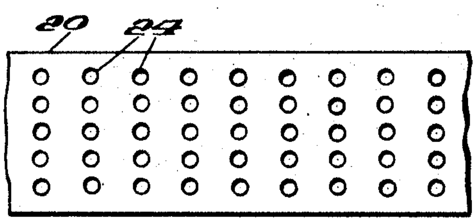
FIG. 3 is a view from above of a recording member wherein "dots" 24 of magnetic material in binders are set within holes in substrate film 20.

The transparent support of the copying member 51 has a series of parallel grooves 52, shown in section, which are filled with hard magnetic particles cemented to each other and to the support with a binder. The magnetic elements are magnetized. The document 53 containing areas of low reflectivity 54 is placed substantially in contact with the copying member. Incident radiation 55 passes through the copying member between the filled areas to the document. The incident radiation thermally biases the magnetic elements of the copying member to a temperature towards the Curie point range. Radiation reflected selectively by the more reflective parts of the document raises the temperature of the adjacent elements of the copying member above the Curie point range and thus selectively demagnetizes the copying member to form a magnetic image reproducing the less reflective areas of the document.

Figure 12:
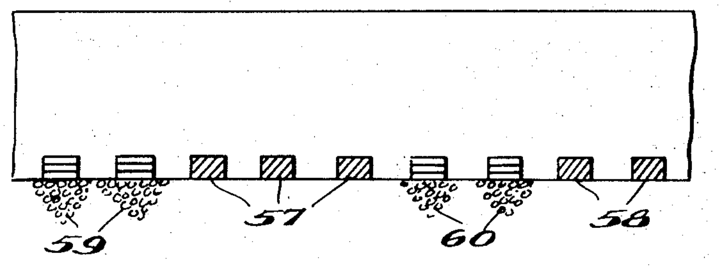

FIG. 12 shows the magnetic recording member after removal of the document and treatment with a toner containing ferromagnetic particles. Areas corresponding to the more reflective elements of the document 57 and 58 are demagnetized and do not attract the toner particles. The magnetized areas 59 and 60 attract the toner particles thus rendering the magnetic image visible. By pressing the copying member on paper or the like the toner particles can be transferred to the paper and fused to the paper by heat, thus forming a copy of the document.

Figure 13:
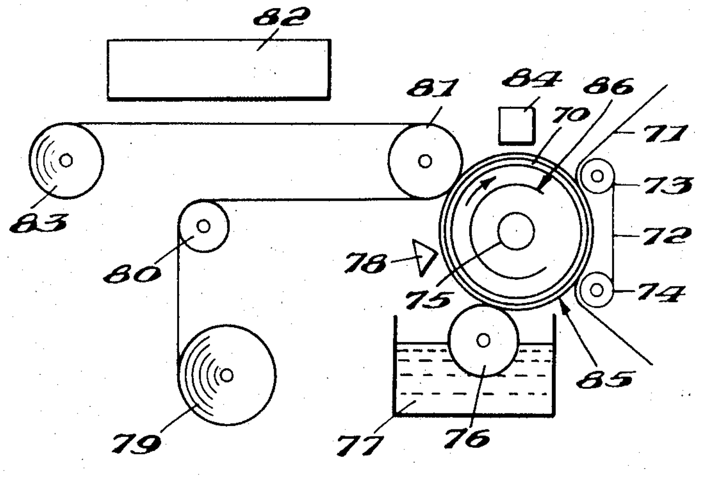

FIG. 13 shows a schematic view of an apparatus which can be used for the thermomagnetic reproduction of documents. In this drawing, the magnetized thermomagnetic copying member in the form of a film 85 is placed over the surface of a transparent drum 70 which is driven in the direction indicated by the arrow. The document which is to be copied, 71, is fed through the machine in stationary relationship with the copying member by friction applied by the flexible belt 72 which holds the document in contact with the copying member and moves synchronously therewith over the idling rollers 73 and 74. Inside the drum 70 is positioned a xenon flash lamp 75 which emits flashes of light at high intensity, and having a duration of the order of a millisecond over the surface of the member in contact with the document as defined by the stationary mask or shield 86. Each flash forms a magnetic image of the document on the copying member as described above. The copying member returns to substantially its initial thermal state in about 0.5 second, and the flashes are spaced in time at somewhat longer intervals. The speed of document feed and drum rotation is maintained so that each portion of the document is exposed to the radiation at least once while in contact with the copy member.

The magnetic image can then be developed by padding on a toner, containing ferromagnetic particles with a fusible binder on the surface of the particles, by the padding roll 76 which dips in a bath 77 containing the toner slurry. Surplus toner is removed by the wiping means 78. The image is then transferred to paper which is fed from a roll 79, passing over the idling roll 80 and thence in contact with the recording member by the pressure roll 81, where the image is transferred. The toner particles are then fused to the copying paper by a bank of heaters 82, and the paper is removed on the roll 83.

Once the document has passed through the machine forming the magnetic image, a large number of copies can be made by continued rotation of drum 70, since the image is substantially permanent. The image can be destroyed and the magnetic recording member returned to its uniformly magnetized state ready to copy further documents by operation of the magnetic head 84.

Figure 14:
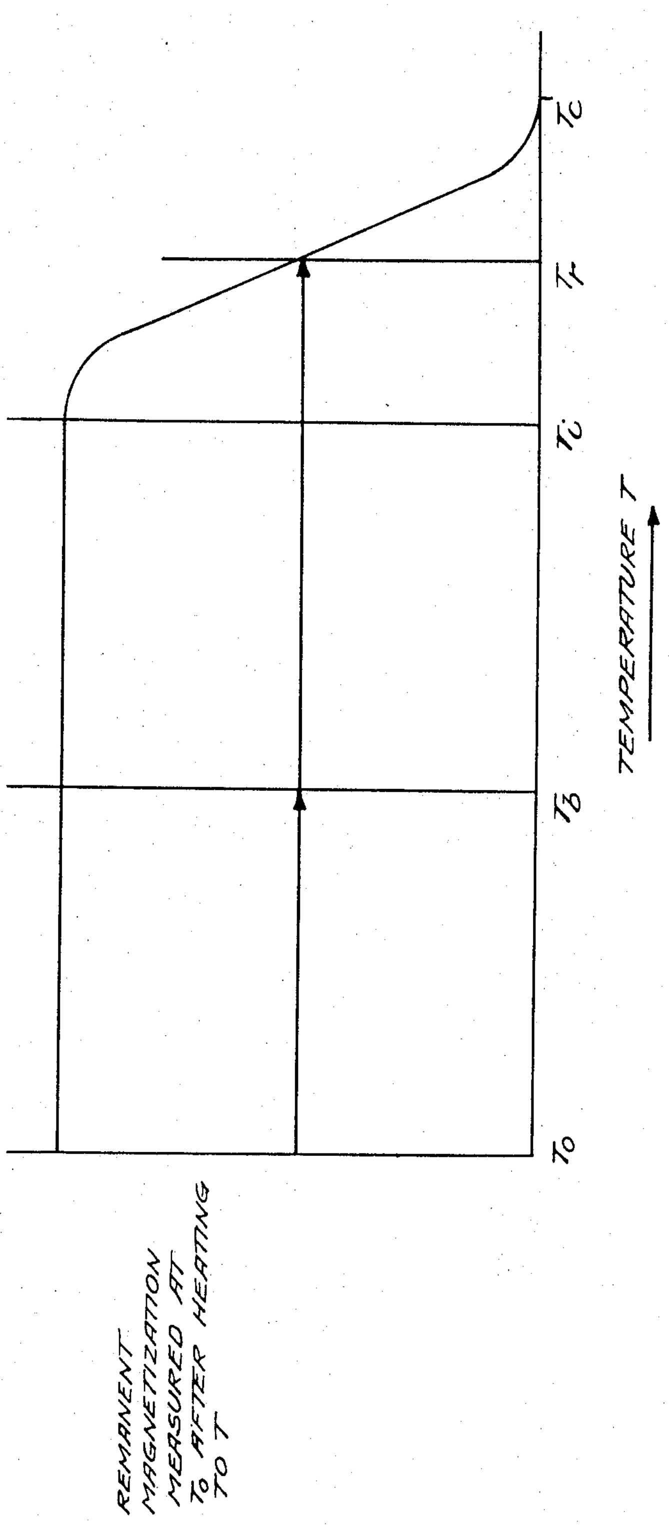

FIG. 14 is a graph showing the remanent magnetization $M_r$ of a magnetized magnetic material, measured at $T_o$, the base temperature, after heating to temperature T and then cooling to $T_o$.

Referring now to FIG. 14, it will be seen that on heating a magnetized material to some temperature T above the initial temperature $T_o$ (which can be room temperature or some temperature higher or lower than room temperature) and then cooling back to $T_o$, substantially no change in the magnetization occurs so long as T is below $T_i$, the lower temperature limit of the Curie point range. When T is in the Curie range of temperature, between $T_i$ and $T_c$, the Curie temperature, the remanent magnetization decreases, and when T is above $T_c$ the magnetic material is demagnetized.

In the process of reflex thermomagnetic recording, the light initially passes through the magnetic recording member and is partially absorbed by the magnetic material, which is raised to a temperature $T_b$. The temperaure $T_b$ can be regarded as an instantaneous bias temperature. The support is transparent to the exposing light, and accordingly is not substantially heated in this process. The light which passes through the partially transparent recording member is selectively reflected by the document and further heats the magnetic material of the recording member to a temperature $T_r$. If $T_r$ is below $T_i$, i.e., little light is reflected, the magnetization of the recording member is unchanged. If $T_r$ is between $T_i$ and $T_c$, as shown in FIG. 14, the magnetic material thus exposed is partially demagnetized. If $T_r$ is above $T_c$, then the magnetic material is completely demagnetized.

The magnetic material must be heated by brief exposure to the exposing light in order to avoid diffusion of the heat image. Desirably, this exposure should be less than 10 milliseconds. It is equally important that the magnetic material which is heated above $T_i$ be cooled quickly to avoid diffusion of the image. Although the effective initial temperature for the imaging step is $T_b$, the temperature of the support to which the magnetic material is bound is around $T_o$. Thus a substantial thermal gradient is maintained, regardless of the value of $T_b$, which provides for extremely rapid cooling of the particulate magnetic material.

When the bias temperature $T_b$ is approximately the same as $T_i$ and the reflected light from the document is such that adjacent to the white areas the heating effect of the light is sufficient to raise the temperature of the magnetic material to $T_c$, the system will effectively copy gray-scale, i.e., the demagnetization of the recording member will be substantially proportional to the reflectivity of the document placed in copying or imaging relationship with it.

On the other hand, when $T_b$ is decreased below $T_i$, the contrast of the image, which is the opposite of gray scale, is increased. The contrast is roughly proportional to $$\frac{T_c - T_b}{T_c - T_i}$$

As $T_b$ decreases, the contrast increases, that is, smaller and smaller differences in reflectivity from the background will effectively demagnetize the contiguous areas of the recording members.

The bias temperature $T_b$ can be adjusted relative to $T_i$ by design of the recording member. Thus if the proportion of magnetic material covering the surface of the recording member is increased to decrease the transmission to light of the recording member, the proportion of light available for reflection from the document is decreased, and $T_b$ is effectively increased when the intensity of light is sufficient for imaging.

The contrast of the system can also be increased by choice of a magnetic material in which $T_c - T_i$ is smaller, other things being equal.

DETAILED DESCRIPTION OF THE INVENTION

The principal application of the magnetic recording member of the present invention is in reflex thermomagnetic copying of documents.

The term document is used throughout this specification and claims to mean any instrument capable of conveying information by a reflectivity gradient to light. More specifically, the term document is inclusive of any writing, book, halftone, line screen, photograph, transparency, typewritten sheets, printed matter, etc.

In general, documents can be read with the naked eye, i.e., they selectively reflect visible light. Faithful reproduction of such documents by thermomagnetically forming a magnetic image on a recording member by the light reflected from the document requires the use of visible light as the exposing radiation. However, the light can also include the region of the electromagnetic spectrum adjacent to the visible region of the spectrum, namely the infrared and ultraviolet regions of the spectrum. The term "light" is therefore employed in this specification and claims to mean visible light and infrared or ultraviolet radiation adjacent to the visible region of the spectrum.

The prime requisites of the magnetic recording member of this invention are that they be substantially transparent to the exposing light, yet contain enough magnetic material to permit the formation of a magnetic image of sufficient intensity for convenient read out. These requirements can be satisfied by patterning the members as described in connection with the drawings.

Figure 4:
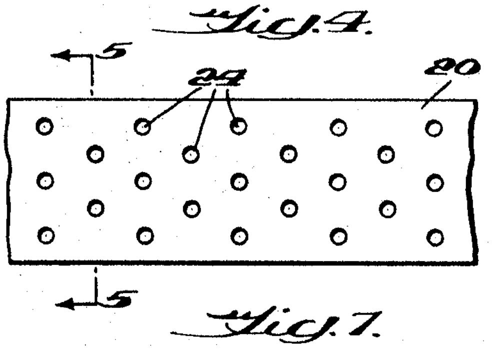
FIG. 4 is a view similar to FIG. 3 showing, however, a different arrangement of dots 24.
Figure 6:
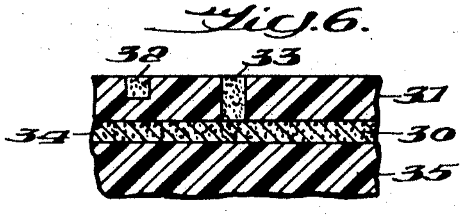
FIG. 6 is a section through a laminated recording member in which substrate plastic film 31, containing dots 32 and 33 of different depths of magnetic material, is firmly bound by an adhesive layer 34 to a carrier film 35.
Figure 7:
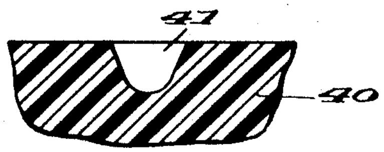
FIGS. 7, 8 and 9 are enlarged sections through substrate film 40 showing different configurations 41, 42 and 43 which may represent cross-sections, hollow retaining means for either dots (holes) or lines (grooves) of magnetic material.
Figure 8:
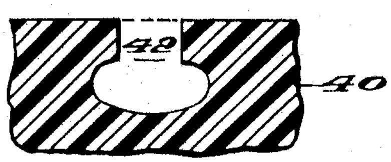
Figure 9:
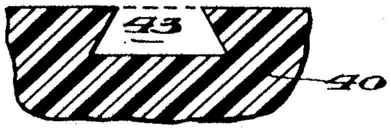
Figure 10:
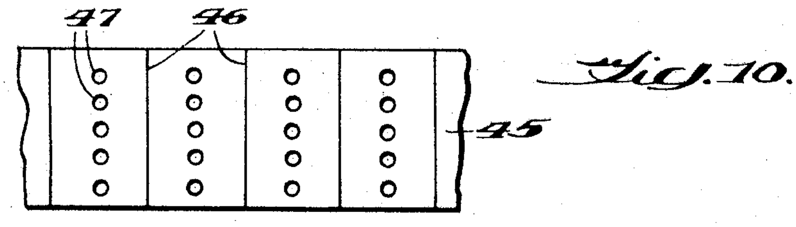
FIG. 10, like FIGS. 1, 3 and 4, is a view from above of a film 45 carrying, however, both lines 46 and dots 47 of magnetic material.
Figure 11:
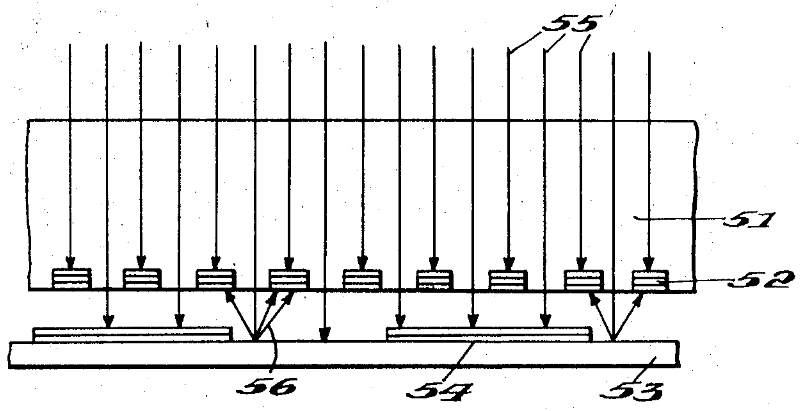
FIGS. 11 and 12 show the use of a magnetic recording member of this invention in a process of reflex thermomagnetic recording.

While the drawings have illustrated a line recording member with regularly disposed, uniform width, evenly spaced, magnetic lines and a dot recording member with regularly disposed dots in equally spaced rows and columns and of the same diameter as indicated in FIG. 4, this high order of regularity is not absolutely necessary, although desired. Thus, it is within the purview of this invention to use for reflex exposure, a member containing both lines and dots or other shapes of magnetic material of equal or different dimensionalities, either equally spaced or substantially evenly spaced.

The main controlling factors in the necessary transmission and controllable high magnetic density properties in the line and dot patterns of the reflex masters of the present invention are the relative closeness and size of the pattern units of the magnetic material and the depth of the stratum thereof with respect to the composite surface. Normally, the spacing will be from 1/100 to 1/1500 inch (i.e., 100 to 1,500 l.p.i.) and preferably 1/300 of 1/750 inch (300 to 750 l.p.i.). The depth of the magnetic stratum will be from 0.05 to 2 mils and preferably from 0.1 to 1 mil.

In part, the relative spacing of the magnetic elements is required to produce an image which is continuous to the eye. In addition to the usual optical effect wherein small elements are not perceived by the eye, e.g., in conventional half-toning, the magnetic elements of the recording members produce a magnetic field between the elements which is greater the closer the spacing. Since most methods of magnetic read-out depend on the field produced by the magnetization, the effect of the closely spaced patterning is to produce more uniform read-out, e.g., by attracting magnetic pigment more uniformly on the magnetized areas of the member regardless of their extent.

In order to obtain a high quality magnetic image by exposure of a premagnetized recording member to a radiant energy image of intensity sufficient to heat the magnetic material into the Curie temperature range, the effects of thermal diffusion must be minimized.

This is, in part, accomplished by the use of brief exposure times of the magnetic material to the radiant energy. In part, this is also accomplished by the design of the recording member of this invention, i.e. by the patterning of the magnetic stratum, by the depth of magnetic material in the stratum, and by the use of a finely particulate magnetic material which is bound together and to the support with a binder of low heat conductivity.

The magnetic material must be capable of magnetization such that it exhibits an energy product $(BH)_{max}$ of 0.08–8.0 gauss oersteds$\times 10^6$, a remanence $B_r$ of 500–21,500 gauss, a coercivity $_iH_c$ of 40–6,000 oersteds and a Curie-point temperature of from approaching 0° K. to 1,150° C., preferably from 25° C. to 500° C. Desirably, the magnetizable material should also have as high as saturation magnetization and remanence, i.e., $B_s$ and $B_r$, respectively, as possible, consonant with the just recited desirable property range.

A particularly outstanding species of the magnetic material which can be used in making the recording members of the present invention is chromium dioxide ($CrO_2$). This material can be used in substantially pure form, or modified with one or more reactive elements. The term chromium dioxide as used in this application is specifically inclusive of the pure form and the modified forms. Suitable descriptions of both the process of preparation and the compositions which have; the necessary properties will be found in the following illustrative list of issued U.S. patents: Arthur U.S. 2,956,955; Arthur and Ingraham U.S. 3,117,093; Cox U.S. 3,074,778; U.S. 3,078,147; U.S. 3,278,263; Ingraham and Swoboda U.S. 2,923,683; U.S. 2,923,684; U.S. 3,034,988; U.S. 3,068,176 and Swoboda U.S. 2,923,685. For pure $CrO_2$ the Curie temperature is near 119° C. This varies somewhat depending on the modifiers used in the synthesis of $CrO_2$, but Curie temperatures in the range of 70° C.–170° C. are easily attainable with modified $CrO_2$. This range of temperature is conveniently accessible and forms a preferred temperature range.

Chromium dioxide has a relatively low Curie temperature, and when in the desired particulate form has a relatively high coercivity and relatively high remanence. Finely particulate chromium dioxide further absorbs light uniformly throughout the region of the visible spectrum, i.e., it is black to the exposing light.

Other magnetic materials which can be employed include chi-iron carbide and $\gamma Fe_2O_3$.

Desirably, the material capable of magnetization to the hard, magnetic state will be of particle size of one micron or under, although particles having a maximum dimension as large as 10 microns such as the chromium dioxide particles described by Arthur in U.S. Pat. 2,956,955 can be used. Such particles tend to agglomerate and, accordingly, any one magnetizable area will have agglomerates having a maximum dimension up to 10 mils. In recording and copying techniques, the resolution is a function of the particle size of the working component involved. The smallest unit which can be charged magnetically is a domain, and in small particles the size of the domains is limited by the particle size. Accordingly, the smaller and more uniform the particle size of the material to be magnetized, the better. Preferably, these particles should have a maximum dimension in the range 0.01 to 5 microns, and most especially 0.1 to 2.0 microns. The particulate nature of the magnetic material also serves to limit the spread of the heat image by thermal diffusion, particularly when the particles are bound together and to the support with a binder of relatively low thermal conductivity.

The recording member consists of the above-described magnetic material disposed patternwise in a stratum on a support to impart the necessary degree of transparency.

For reflex thremomagnetic recording, the member must have substantial transmission to light, the degree of transmission modifying the flash bias characteristics of the process as explained above in connection with FIG. 14. Patterning the recording member provides this transparency to light which should be between 5% and 95% transmission, and is generally between 10% and 90%. Best results in reflex copying are obtained with copying members having a transmission to light in the range of 50% to 90%.

The nature of the support in and/or on which the magnetizable stratum is positioned can vary widely through such a range as from glass to flexible polymers. Because of the ease of handling, the preferred substrates are the flexible polymeric ones. The prime property for the substrate is that it be transparent to the light used to effect the imagewise demagnetization. Preferably, it should be of low heat conductivity.

The support can assume any convenient form, and can be flexible or rigid. The support can, for example, be in the form of an endless belt which is driven past the magnetizing means, recording means and optionally the toning and printing means or other read out. On the other hand, the support can be essentially flat and the recording member attached thereto and driven through the various treating means by a reciprocating mechanism.

In the apparatus described in FIG. 13, the support is in the form of a thin film of a plastic material which is placed around the drum. It will be apparent that the drum itself can be the support with the magnetic working material attached directly thereto.

The thickness of support when a flexible material is used is generally in the range 0.1 to 10 mils.

The support may be solvent and/or heat embossable, or a coating or film having the desired embossing characteristics may be applied to the support.

The magnetic material is bound to the support with a suitable binder which desirably has low heat conductivity. The primary requisites of these low conductivity binder matrices are that:

(1) They be non-reactive with the particulate magnetic material, i.e., the working component;

(2) They be thermally stable to reasonable levels, e.g., 200–400° C. for short (millisecond) periods and stable to the exposing radiation; and (3) They be preferably flexible and in any event readily processible by conventional techniques such as solution, milling, calendering, extrusion and the like.

Suitable binders include the various commercially available acrylate and methacrylate, as well as functionally substituted acrylate and methacrylate, polymers; the various vinyl and vinylidene polymers and copolymers, such as the vinyl chloride/vinyl acetate, vinylidene chloride/vinyl acetate, and vinyl chloride/vinyl fluoride polymers; the various olefin polymers and copolymers, such as polyethylene and polypropylene; ethylene/vinyl acetate copolymers, ethylene/vinyl chloride copolymers and the like.

Other binder or matrix materials, including natural, modified natural, and synthetic materials, can also equally well be used, provided they exhibit the fundamentally necessary physical properties of being unaffected by magnetic force fields not thermally sensitive, and compatible with the magnetic material involved. Suitable more specific matrix materials, in addition to the just previously enumerated specific examples of addition polymers, include such natural matrix materials as tung or China wood and linseed oils, the well-known commercially available epoxy resin formulations, air-settable polyol acrolein acetals and ester formulations thereof, etc., any of the many well-known printing ink and lithographic type varnishes, the natural resins such as Copal, shellac, Damar gum, and the like; the drying oils, any of the many well-known alkyd-based varnish and drying oil-type formulations; the derived natural polymers such as regenerated cellulose, i.e., rayon; cellulose acetate, cellulose acetate/propionate, cellulose propionate, cellulose acetate/butyrate and the like; the synthetic condensation polymers such as the well-known nylons, e.g., polycaprolactam, polyhexamethyleneadipamide; polyurethanes, e.g., that from ethylene glycol/adipic acid/tolylene diisocyanate; as well as the polyurethanes based on relatively high molecular weight addition glycols such as that from a polytetramethylene ether glycol obtained by ring opening of tetrahydrofuran/adipic acid/tolylene or hexamethylene diisocyanate with, if desired, a finishing diamine, such as hexamethylenediamine, and the like; thermosetting resin binders or matrices such as, for instance, the polyurea-formaldehyde and modified polyurea-formaldehyde compositions wherein the modifying component can be, for instance, an amine such as hexamethylenediamine and the like.

In addition to the foregoing largely wholly organic binders and matrices, suitable inorganic binders and matrices can be used, the only requirement being that they be transparent to the exposing radiation. Suitable examples include the silicones, the Ludox® silicas, aluminum oxide film-formers, titanate film-formers which can be dispersed or substantially vapor deposited and heat set, and the like.

A variety of methods can be employed to make the magnetic recording member of the present invention.

In one method of making the magnetic recording members of the present invention the pattern is printed as a stratum on the surface of the support using an ink which has as its pigment discrete magnetic particles dispersed in or coated with a suitable binder medium. Half-tone plates may be used in the printing process to print patterns of dots and/or lines. The printed recording member can be used in this form, or the interstices between the patterned magnetic material can be filled with a liquid composition capable of forming a plastic material, which is then solidified. The filling material can be applied with a doctor knife, or by wiping, or like procedures.

The preferred method of making the magnetic recording members of the present invention is to emboss a substrate with the desired pattern of indentations and then fill the indentations with a mixture of the hard magnetic material and a binder in a flowable condition. The mixture should be of the high solids type in order to avoid excessive shrinkage on solidifying the binder composition. The embossing can be done by various methods, but preferably a master plate having a raised pattern, corresponding to the pattern of indentations desired, is employed to emboss a plastic support using heat and/or solvents to soften the surface.

Orientation of the magnetic material greatly improves the magnetic properties of the reflex recording members. In orienting the magnetic particles, e.g., $CrO_2$, within the discrete surface areas (e.g., grooves) higher magnetic remanent values are obtained resulting in a squarer hysteresis loop which is needed for a greater magnetic output for the reflex imaged film. This enhances the attraction for toner particles during development. Orientation can be done in two directions: one along the length of the recording member, i.e., in the plane thereof, called horizontal orientation; the other perpendicular to the plane of the film, termed vertical orientation.

Both types or orientation require a certain range of viscosity of the coating formulations of magnetic material and liquid binder composition wherein the particles of the magnetic material can move freely and align themselves along the direction of the applied magnetic field. For $CrO_2$-based compositions as above, a viscosity of 40,000 cps. (taken on a Brookfield Viscometer with a No. 7 spindle at 50 r.p.m. and at 22° C.) was found to be the maximum value of viscosity permitting orientation. The preferred viscosity range is 30,000–40,000 cps. Below about 10,000 cps., agglomeration rather than orientation can occur.

Vertical orientation is achieved by placing the freshly coated film between the two attracting poles of an electromagnet with higher degrees of orientation varying in the same direction with higher magnetic field strength. A field of 4,000 gauss results in 85–92% vertical orientation as determined by the X-ray diffraction pattern resulting from the reflection of the 002 plane of the acicular $CrO_2$ particles.

Horizontal orientation is achieved by passing the freshly coated member between the opposing poles of two U-magnets which provide a range of 3,000–8,000 gauss for orientation depending on the distance between the two magnets and the width of the gap at the center. By passing the member six times at a field of 4,000–6,000 gauss, 90–92% orientation could be attained. In both types of orientation, the binder material should be hardened rapidly, e.g., with a solvent liquified composition hot air is applied immediately after orienting to volatize the solvent in order to hold the particles in the preferred direction of magnetization. The amount of horizontal orientation is determined by X-ray transmission diffractometry whereby the degree of the preferred alignment of the c-axis parallel to the length of the reflex film is measured.

Machine testing of the films with the above types of orientation showed a much better imaging quality for the horizontally oriented particles whether on dots or on line patterns. The copies obtained with horizontal orientation were much better in terms of copy density while the vertically oriented films gave only a fair amount of reflectance density. These tests were made with a development time of three seconds. If development times were prolonged, the vertically oriented film gave better resolution of the images although the horizontally oriented films still gave much denser copies.

The above-described magnetic recording members are particularly adapted for reflex magnetic recording of images, which are subsequently read-out by decorating the imaged recoding member with a magnetic pigment followed by transfer of the magnetic pigment to paper or the like to form a copy. The magnetic recording members of this invention, however, have many useful properties which render them suitable for other applications, e.g., for the recording of images by direct exposure to imaging radiation, by electron beams or the like, particularly when field-dependent read-out and especially when read-out with toner is employed.

SPECIFIC EMBODIMENTS OF THE INVENTION

This invention is further illustrated by the following specific examples, which are not, however intended to fully delineate the scope of the present discovery. In these examples parts and percentages are by weight unless otherwise specified.

Example I

Shallow parallel grooves were machine cut into a polished 1" square surface of a 1" x 1" x ¼" brass block to obtain 1000 grooves, 0.5 mil (0.0005") wide, 0.2 mil (0.0002") deep, and 0.5 mil apart, all on centers. The 1,000 lines per inch (l.p.i.) grooved surface of the block mounted horizontally, was wetted with excess tetrahydrofuran and an excess of a 12.5% solution of high molecular weight polyvinyl chloride (PVC) (Goodrich Chem. Co.'s Geon® 101 EP) in tetrahydrofuran was applied to the center of the wetted surface. Upon drying and stripping, there was obtained a bubble-free, clear, transparent PVC film having on one surface an opposite height relief image of the grooved metal surface, the film having a thicknes of approximately 8–10 mils.

A 15% solution consisting of 50.4 g. of medium molecular weight poly(methyl methacrylate) (Lucite® 41) in 285.6 g. of toluene was ball-milled for 174 hours with 50.4 g. of chromium dioxide prepared as described in Cox, U.S. 3,278,263 (in the form of acicular particles average length 0.5$\mu$ with length/breadth about 15–20/1., ${}_iH_c$ of 401 oersteds, $\sigma_s$ of 80 emu/g. measured at 4,400 oersteds) and 4 cc. of isooctylphenoxypolyethoxyethanol (Triton® X–100, a commercially available nonionic dispersing agent). This $CrO_2$ suspension was used to fill the 0.2 mil deep grooves of the above 1,000 l.p.i. relief image film, excess being removed by wiping the filled film against bond paper slightly moistened with toluene to assure overall surface planarity of the composite filled film.

The filled film, after drying, was magnetized in an average 1,500-gauss magnetic field and placed with the filled side in contact with a Bureau of Standards resolution chart containing printed figures and a series of black lines. An electronic flash unit (Ultrablitz Cornet M) with a capacitance of 300 $\mu$f. was charged to 500 volts and discharged through the back of the magnetized film. The film was separated from the chart and then immersed briefly in a suspension of fine metallic iron powder in a hydrocarbon solvent (Visimag® F) and dried in air. The iron particles were observed to cling to the portions of the $CrO_2$-containing film corresponding to the image areas of the original black line images and printed figures. The iron powder pattern was then transferred by slight pressure onto a pressure-sensitive adhesive sheet, giving a right-reading positive copy with good fidelity, resolution, and contrast of the original chart on the sticky side of the adhesive sheet.

Example 2

A brass cylinder, 2" in diam. and 3" long, was cut on a lathe, and the surface of the cylinder was mirror polished. A spiral groove 0.2 mil deep and 0.5 mil wide with adjacent annular grooves spaced 0.5 mil apart, all on centers, was cut into the surface of the cylinder, thus giving 1,000 grooves per inch. A very thin hard chromium electroplate with an estimated thickness of 0.05 mil was applied to the surface of the grooved cylinder.

The grooved and plated cylinder was mounted in a horizontal position so that it could be rotated axially on its major dimension. The end of a 3" x 6" piece of cellulose acetate film three mils thick was fastened to the surface of the cylinder in an axial direction with pressure-sensitive adhesive tape. A jet of acetone from a wash bottle was directed into the nip of the film as it was wrapped around the cylinder by rotating the cylinder. The other end of the film was fastened to the cylinder with tape and the entrapped acetone layer was allowed to evaporate through the film. The dried film on removal from the cylinder was found to have, embedded in its surface, an exact opposite height relief image of the 1,000 l.p.i. 0.2 mil deep grooves on the surface of the cylinder.

A solution was prepared from 75 parts of polyvinyl alcohol (PVA) containing some unhydrolyzed acetate groups (Du Pont Elvanol® 51–05) and 175 parts of dimethyl sulfoxide (DMSO). This was passed six times through an ink mill with 112 parts of chromium dioxide (${}_iH_c$ 594 oersteds, $\sigma_s$ 82 emu/g., $\sigma_r$ 41 emu/g.) and 3 parts of Triton® X–100, with added dimethyl sulfoxide to maintain the desired milling viscosity. The resulting paste was doctored into the grooves of the 3" x 6" relief image film, with the doctor blade held substantially parallel to the grooves. The surface was cleaned of material adhering to the narrow surfaces between the filled grooves to assure uniform surface planarity and the film was allowed to dry.

The filled film was magnetized, flashed, developed and printed as described in Example 1, but the printed image was not as intense as that obtained in Example 1 since the grooves were somewhat less sharp and overall shallower than those of Example 1.

Example 3

A copper plate having 750 grooves per inch was prepared by a photoengraving process involving exposing a thin layer of a commercial water-soluble/light insolubilizable photoresist on a smooth copper plate through a 750 line-pattern negative, dissolving with water the unhardened resist in the unexposed areas corresponding to the black line areas of the negative, etching grooves to a controlled depth of about 0.3–0.5 mil, and a finally removing the remaining hardened resist. A relief image was made of the etched surface by flooding it with acetone while supported horizontally and squeegeeing a 3-mil cellulose acetate film onto the wetted surface and letting it dry while in intimate contact with the etched plate. After separation, the dry film, which was a relief image of the above etched surface, was filled with the $CrO_2$/PVA/DMSO magnetic paste of Example 2 with a parallel block held at a 45° angle as the doctor knife.

The above film was used in printing a right-reading positive image by reflex thermomagnetography as described in Example 1.

Example 4

A Dycril® photopolymer printing plate with 750 recesses per inch (each about 0.3 mil deep) in each direction of the two dimensional surface was prepared from a 750 l.p.i. dot negative. An opposite height relief image of this Dycril® plate was prepared with liquid, air hardening silicone resin (General Electric Co. RTV–11). An opposite height relief image of the silicone surface was in turn prepared by use of a room-temperature hardening mixture of commercial liquid epoxy resin and hardener (Bakelite ERL 2795 and 2793). The relief image thus obtained in the hardened epoxy was silver sprayed and electrically plated with Ni in a nickel sulfamate bath using a Ni anode and the plate as cathode until a nickel plate of approximately 1/32" thickness was obtained, the surface of the nickel thus being an exact relief image (intaglio) of the original Dycril® plate. By applying a 3-mil cellulose acetate film to the acetone-wet surface of the nickel plate in intimate surface to surface contact and allowing it to dry, a relief image of the nickel plate was obtained which was an exact opposite height relief replica of the original Dycril® plate.

The regularly disposed pits or indentations in the cellulose acetate replica were filled with the $CrO_2$/PVA/DMSO magnetic paste of Example 2. The area between the filled grooves was wiped free of excess paste without difficulty.

The dried, filled film was magnetized in an average 1,500-gauss field, placed face down on a printed resolution chart (Bureau of Standards) and flashed through from the back using a G.E. FT 91/L xenon flash tube in a spherical reflector operated from a 140 $\mu$fd. capacitor bank charged to 900 volts. The output energy of the lamp at the 4" distance employed was 0.15 joule/cm.$^2$ at the filled film surface. The flashed $CrO_2$-filled film was developed in a suspension of type GQ4 carbonyl iron powder (General Aniline & Film Corp.) in 1,1,2-trichlorotrifluoroethane (Du Pont Freon® TF). The developed image was transferred by pressing it against an adhesive-coated white paper thereby giving a right-reading print of the resolution chart with good fidelity, resolution, and contrast.

Example 5

A 6" x 6" etched copper plate having a 750 l.p.i. recessed dot pattern was made by the process of Example 3. It was pressed into a soft lead sheet at a total pressure of 1,200 tons. From this lead sheet, 3-mil thick cellulose acetate film replicas of the original copper plate were prepared by the method described in Example 3. One of the above cellulose acetate replica films was filled with the $CrO_2$/PVA/DMSO paste of Example 2 and the flat area between the filled pits was easily wiped clean of excess paste. The filled film was used in the development and printing of a reflex thermomagnetic image as described in Example 4.

Example 6

A 3-mil Mylar® polyester sheet was coated with a thin layer of a solution in methyl ethyl ketone of a thermoplastic amorphous polyester adhesive. While the adhesive layer was still wet, a 3-mil cellulose acetate sheet was rolled into it and the laminated film was allowed to dry. A 750 l.p.i. line pattern electroformed plate with about a 0.3-mil high relief was pressed into the cellulose acetate side of the laminate at 125° C. in a Carver press at a pressure of 1,000 p.s.i. for two minutes to give an opposite height relief image of the electroform. As an alternative method, the adhesive coating on the polyester film was allowed to dry first and the cellulose acetate film was caused to adhere to the polyester film during the embossing step, carried out as described above.

The laminated cellulose acetate-on-polyester films having 750 grooves per inch pressed into their surface were filled with an ink-milled paste and made up from 70 parts of chromium dioxide ($_iH_c$ 594: $\sigma_s$ 82; $\sigma_r$ 41, cf. Example 2) and 30 parts epoxy resin (Bakelite ERL 2795) with sufficient added 2-butoxyethanol to give the desired milling viscosity. After partial curing at room temperature with tetraethylenepentamine (TEPA) curing catalyst, excess paste was cleaned from the top surface of the film, leaving the grooves filled to the upper surface. The curing of the epoxy binder was completed by leaving the filled film at 50° C. for 16 hours.

The dried, filled film was magnetized in an average 1,500-gauss field, placed with the filled surface in contact with a printed resolution chart (Bureau of Standards), and flashed from the back with a xenon flash lamp as before. The latent magnetic image was developed in an aqueous dispersion of a toner consisting of 5–10$\mu$ particles of a 70/30 mixture of $Fe_3O_4$ and a thermoplastic polyamide (General Mills' Versalon® 1112) spray-dried from n-propyl alcohol. The developed image was transferred to paper with heat and pressure to give a clean, dark, right-reading print of the resolution chart with good fidelity, resolution, and contrast.

Example 7

A thin coating of an amorphous polyester adhesive was applied to flame-treated 5-mil Mylar® polyester film. A solution of a 66/610/6 nylon polyamide resin (Zytel® 61) in 88% ethanol was cast onto the adhesive coated surface polyester film and allowed to dry. The resultant nylon surface of the composite film, about 0.8–1.0 mil thick, was embossed with the 750 l.p.i. line pattern electroformed plate as per Example 6 at 140° C. and 1,000 p.s.i. for three minutes.

The resultant embossed composite film was filled with the magnetic paste of Example 6. Some difficulty was encountered in cleaning the excess paste from the top surface of the film. The filled film was cured and used to copy the printed resolution chart all as described in Example 6.

Example 8

A solution made from 15 g. of high molecular weight ethyl cellulose, 225 cc. of tetrachloroethylene, and 25 cc. of 4-methyl-2-pentanone was cast on 5-mil flame-treated Mylar® polyester film coated with a thin layer of amorphous polyester adhesive and allowed to dry. The resultant ethyl cellulose face of the composite film, about 0.8–1.0 thick, was embossed with 750 l.p.i. dot pattern electroformed nickel plate as per Example 6 at 125° C. and 600 p.s.i. for three minutes. The embossed film was filled with the magnetic paste of Example 6, wiped clean after partial curing at room temperature, and finally cured overnight at 50° C. The cured, filled film was used in reflex thermomagnetographic copying of the resolution chart as described in Example 6.

Example 9

A solution of 30 g. of a commercial polycarbonate resin (General Electric's Lexan® 105) in 150 cc. of 1,1,2-trichloroethane was cast on 5-mil Mylar® polyester film which had been precoated with a thin film of an amorphous polyester adhesive mixed with a modified diisocyanate and allowed to dry. The resultant polycarbonate surface of the composite film, about 0.8–1.0 mil thick, was embossed as per Example 6 with a 500 l.p.i. dot pattern electroformed plate at 180° C. and 600 p.s.i. for three minutes. The regularly spaced, minute pits were filled with an ink-milled paste composed of 70 parts $CrO_2$ ($_iH_c$ 417 oe.; $\sigma_s$ 79 emu/g.; $\sigma_r$ 38 emu./g.) in an alkyd varnish (Archer-Daniels-Midland's Aroplaz® 1271), followed by partial air/room temperature curing, wiping, and air-drying. The cured, filled film was used to copy the resolution chart as described in Example 6.

Example 10

A horizontally mounted 500 l.p.i. dot pattern electroformed plate with a relief of about 0.3 mil was flooded with methylene chloride, a 5-mil thick Lexan® polycarbonate film was squeegeed onto it, and the polycarbonate film in turn was covered with a thin Mylar® polyester film held flat with a metal plate. After 10 minutes the upper metal plate and polyester film were removed and the methylene chloride was allowed to evaporate through the polycarbonate film. When completely dry, the polycarbonate film was removed from the electroform and was found to have impressed in its surface an opposite height relief image of the electroform.

The regularly pitted surface of the polycarbonate relief image film was filled with an ink-milled paste composed of 70 parts of chromium dioxide and 30 parts of a liquid alkyd resin binder (cf. Exmaple 9). Excess paste was removed after partial air/room temperature curing, leaving each pit filled to the top, with no paste on the flat areas between the pits. Final curing in air was accelerated by heating at 45–50° C. overnight.

The cured film was used in the copying of type-written material on white paper by the process described in Example 6 where the typed copy was substituted for the resolution chart.

Example 11

A 500 l.p.i. dot pattern electroform as in Example 10 was pressed into 10-mil unsupported Lexan® polycarbonate film at 180° C. under 600 p.s.i. for five minutes. The resultant opposite height relief image film was filled with an ink-milled magnetic paste composed of 70 parts chromium dioxide (${}_{i}H_c$ 424 oe.; $\sigma_S$ 80.3 emu/g.; $\sigma_r$ 36.7 emu/g.) and 30 parts of a commercial epoxy resin (Bakelite ERL 2795) catalyzed by TEPA. The film surface was cleaned of excess black paste after partial air/room temperature curing, and curing was completed by overnight heating at 40–50° C.

The cured, filled film was used in reflex thermomagnetic copying of the resolution chart as described in Example 6.

Example 12

An ink was prepared containing 200 gm. of the $CrO_2$ of Example 11, 50 gm. epoxy resin (Bakelite ERL 2795) and 125 cc. of butyl Cellosolve®.

A 4½" x 5" solvent replicated cellulose acetate film containing 500 lines/in. was prepared as in Example 3 and the grooves therein filled by means of the straight edge of a doctor knife with a mixture of 10 gm. of the above ink and 0.21 gm. of TEPA curing agent. The coated film was then placed between the two attracting poles of an electromagnet having a magnetic field of 4,000 gauss and hot air from a hand blower was applied for about five minutes. The film was from the magnetic field, allowed to stand at room temperature for two days, and heated at 50° C. for 16 hours for final curing. Excess coating on the film surface was removed by wiping with soft tissue paper. The vertical orientation of the magnetized $CrO_2$ particles was 92% as determined by X-ray reflection diffractometry showing the degree of the preferred alignment of the c-axis normal to the plane of the film. Exposure and development as in Example 6 with a development time of 3 seconds gave a faint copy density. Longer development times up to 9 seconds gave a fairly dense copy and marked resolution of the transferred image.

Example 13

A horizontally oriented film was prepared by the procedure of Example 12 except that the freshly coated film was passed six times between the opposing poles of two U-magnets having a magnetic field of 4,000 gauss. The horizontal orientation of the $CrO_2$ particles was 91.3% as obtained by X-ray transmission diffractometry showing the extent of the preferred alignment of the c-axis of said particles parallel to the length of the film. Exposure and development as in Example 12 gave a good, black development with a fairly good resolution.

Example 14

An iron oxide (99.0% $\gamma$-$Fe_2O_3$) ink was prepared by mulling for 300 passes on a mechanical muller a mixture of 4 parts of a fine, commercially available iron oxide (J. L. Smith Company product HR–280) of ${}_{i}H_c$ 260 oersteds, one part of a commercially available, long-oil-linseed alkyd of acid value 6–10 (Archer, Daniels, Midland, Aeroplaz® 1271), and 2.5 parts of Stoddard solvent. The resultant thick ink was used to fill the lines of a 25 sq. in. commercially available polycarbonate film (General Electric Company's Lexan®), which was embossed as in previous examples with a line pattern of 500 l.p.i. The thus-filled sheet was dried for two days under atmospheric conditions and the surface then cleaned and polished with a fine alumina abrasive. Finally, the polished sheet was dried at 55° C. under reduced pressure and magnetized by being pulled over the edge of a highly magnetized steel plate.

The resultant magnetized master sheet was placed face to face with a 5-mil thick poly-ethylene terephthalate) film carrying a continuous layer of $CrO_2$, ${}_{i}H_c$ 314 oe., in a poly(vinylidene chloride) binder, and the two were heated under 200 pounds pressure between squared, smooth, aluminum plates in a Carver press at 130° C. for two minutes and the assembly then cooled rapidly with cold water. This pressing temperature is above the Curie temperature of the $CrO_2$, and, by cooling down through the Curie temperature in contact with the $\gamma$-$Fe_2O_3$ sheet, a corresponding line magnetic image was formed in the $CrO_2$ layer.

The magnetized line $CrO_2$ plate was selectively demagnetized by projection through a positive transparency containing both line and halftone copy at 80° C. using a xenon exposure lamp at 1,000 volts. The thus-exposed $CrO_2$ film was developed by dipping into a dilute alkyd oil/water magnetic emulsion ink with stirring. After development for 20 seconds, the $CrO_2$ film was passed in front of an air knife to remove ink from the nonsignalled areas and the thus-developed $CrO_2$ film was pressed by means of a rubber roller in face to face contact with a transfer paper (conventional bond paper), whereby there was obtained on the bond paper a print of the text of the original projection transparency showing good resolution and fidelity in both letter and halftone areas. Substantially the same results were obtained using an inverted positive transparency to afford right-reading copy, and also by picking up the developed magnetic image on a rubber offset blanket with subsequent transfer to the receptor sheet as in offset printing.

The dilute alkyd-oil/water emulsion magnetic ink containing encapsulated pigment was prepared by mixing 5 parts of carbonyl iron powder, 5 parts of a commercially available long-oil-alkyd for ink use (Lawter Chemical Company, Terlon® No. 3), 2 parts of an aliphatic mineral oil containing 0.2 part of a commercially available carbon black for printing ink use (Raven 30), 6 parts of a mill blend containing 3 parts of a commercially available octahedral $Fe_3O_4$ (C. K. Williams IRN 351), 2 parts of mineral oil, and 3 parts of a commercially available dispersing agent—sorbitan monolaurate (Span® 20). This oil phase was stirred rapidly with a single paddle while adding to the slurry a solution containing 60 parts of water and 2 parts of a commercially available polyoxyethylene sorbitan monolaurate (Tween® 20). A thick water/oil paste emulsion formed first, and inversion to an oil/water emulsion occurred after 50 parts of solution was added. This suspension contained oil-alkyd droplets 3–12$\mu$ in diameter with the pigment encapsulated therein. For development, the concentrated suspension was diluted with 320 parts of water and efficient stirring was maintained.

Example 15

A printing ink formulation was prepared from 35 parts of a commercial alkyd for printing-ink use (Aroplaz® 1271, Archer-Daniels-Midland Corp.), 65 parts of $CrO_2$ (magnetic properties: coercivity 415 oersteds, saturation magnetization 78.5 emu/g., measured at 4,400 oersteds at 25° C., remanence 37.6 emu/g.) 5 parts of a commercially available varnish (No. 00 transparent varnish, Superior Varnish Company), and 0.2 part of a commercially available lithographic ink drier (Maff paste).

The above was mixed on a three-roll mill operating with 50–100 lbs. front-to-rear roll pressure for four passes over the rolls. The resultant link was then used on a letter press to print from a 50% tint 300-line/inch commercially available plastic halftone printing plate (Dycril®) onto a 5-mil thick film of a commercially available polyethylene terephthalate film (Mylar®). The resultant ink film was then air-dried resulting in a coating thickness of 0.12 mil, exhibiting a transmission optical density to white light of 0.50 as measured on a Welch Densichron.

The resultant printed film was magnetized in a 1,500 gauss D.C. field and placed in direct contact on top of a printed resolution chart on paper containing 56 lines/inch as the maximum, with the chromium dioxide-bearing surface of the printed film down in contact with the resolution chart. The reflectance optical density of the said resolution chart, again measured on a Welch Densichron with white light, was 1.28 in the printed, i.e., line, regions, and 0.12 in the background regions. A 140 $\mu$fd. capacitor bank was charged to 900 volts and discharged through a General Electric FT 91/L xenon flash lamp housed in a spherical reflector approximately 4″ from the surface of the composite sheets. The energy output of the lamp at this same distance was measured as 0.15 joule/cm.$^2$ at the composite film surface.

The film composite was separated and the exposed $CrO_2$-containing film was dipped into a mixture of five parts of Type L carbonyl iron (General Aniline & Film Company) in 200 cc. of a commercially available fluorocarbon trichlorotrifluoroethane—Du Pont Freon® F113. The film was removed from the developing bath and air-dried. Carbonyl iron particles were found to adhere to the film in the regions thereof corresponding to the printed regions of the resolution chart. Thus, the developed iron image on the $CrO_2$-containing face was wrong-reading as viewed from said face but was right-reading as read through the transparent support. The 56-line/inch image of the original was clearly readable on the developed film. The $CrO_2$-containing developed film was then placed with the iron-developed image directly in contact with an adhesive-coated white paper with the adhesive coating down, i.e., in contact with the iron image. On mild pressure, the carbonyl iron image was transferred to the paper, thereby resulting in a right-reading image of the resolution chart with good fidelity and resolution. Multiple copies were made by repowdering the imagewise demagnetized film and transferring the resultant iron image as above.

Example 16

A commercially available conversion film (Du Pont's Cronapress®) having an opaque, porous-coalescible or opaque, pressure-clarifiable (OPC) coating 0.4 mil thick on a 5-mil oriented poly(ethylene terephthalate) support film was carefully cleaned and wrapped on a 4.42″ diameter metal mandrel with vacuum hold-down holes in the edges thereof fitted on a precision lathe. The mandrel was evacuated and the polyester film bounded firmly in place on the surface thereof. A rotary tool was used to collapse a narrow groove in the soft pressure-clarifiable coating down to the interface with the polyester substrate. The rotary tool had a cutting edge hand-honed from a 0.025″ thick tool-steel blade tapered to a 0.0003″ land at its tip. This rotary tool was advanced by the lead screw on the lathe to cut 480 lines per inch in the OPC film using ethanol as a film/cutting lubricant operating under a protective dust cover.

An electroless copper layer was then deposited on the scribed surface of the Cronapress® film using a commerically available copper plating system (Enthone Corporation, New Haven, Conn.). The scribed film was first placed in a flat tray with the soft coating side up for one minute in a solution of 40 cc. of Enplate® 432 in 600 cc. of distilled water. The thus treated scribed plate was then gently rinsed in distilled water and immersed for three minutes in a solution of 40 cc. of Enplate® 440 in 600 cc. of distilled water, followed by another rinse in distilled water, and finally immersed for 15 minutes in a solution of 80 cc. of Enthone Cu 400A, 200 cc. of Enthone Cu 400B, and 360 cc. of distilled water. A copper plating approximately 15 microinches thick was thus formed on the surface of the film. The copper-plated film was then plated in a commercial nickel-plating bath operating at 110° F. at 1.50 volts for 18 hours to give a nickel plate 18 mils thick.

The scribed Cronapress® film was stripped from the copper layer and the electroless copper layer was next removed from the nickel plate with a dilute aqueous chromic acid (4 oz. per gal.)-sulfuric acid (0.4 oz. per gal.) solution.

A 15″ x 16″ section of a commercially available flame-treated poly(ethylene terephthalate) film (Mylar® 500A) was backcoated to prevent curling with a 0.4 micron thick coating of a commercially available polyether urethane finish (Du Pont's Imron® RK 801 containing 45% by weight solids consisting of 1.0 mole of polypropylene glycol of molecular weight 1025, 1.22 moles of trimethylolpropane, 5.21 moles of a mixture of 2,4- and 2,6-toluene diisocyanates, and 0.3 weight percent of dimethyldodecylamine catalyst in a solvent consisting of 3 parts of toluene, 2 parts of xylene and one part of (Cellosolve® acetate) applied at 5/1 weight ratio acetone/RK801 solution fom a 10″ wide hopper coater having a ⅛″ wide slit covered with Whatman No. 1 filter paper and a fine mesh nylon bolting cloth. This back coating was allowed to air-cure overnight and while preventing curling of the final film, it should be pointed out, is not necessary. The other side of the thus backcoated film was then coated with the same Imron® RK801 syrup at 45 weight percent solids using a doctor knife setting of 15 mils. The coating was allowed to cure at room temperature 16½ hours until it was tack-free and approximately 3 mils thick.

The above-described nickel line plate was used to emboss the 3-mil thick Imron® coating at 125° C. for five minutes at 625 p.s.i. On the following day the embossed film was filled with a thick paste made by ink milling 80 parts of $CrO_2$ and 20 parts of a commercial, curable alkyd binder (Aroplaz® 1271) milled 40 passes on a three-roll ink mill. During milling and coating, the $CrO_2$ alkyd dispersion was diluted with Stoddard solvent so that at the time of coating the viscosity was approximately 60,000 centipoises. The embossed Imron® film was taped down to a clean, smooth work area (a ¼″ thick gum rubber pad covered by 5-mil Mylar®) for the filling operation. The filling was carried out by placing a bead of the $CrO_2$/alkyd/Stoddard solvent ink-milled dispersion in front of a ⅛″ radius steel doctor knife. The doctor knife was held at an angle of 30–35° and was drawn over the area to be coated in a single continuous operation. Several more passes with the doctor knife were then made in rapid succession as the Stoddard solvent evaporated. This took about 30 seconds of elapsed time. A final pass with a sharp edge knife was used to remove most of the excess dispersion from the surface. The alkyd binder was allowed to cure at room temperature overnight. Excess $CrO_2$ and alkyd binder were cleaned from the surface of the film by gentle abrasion with 0.3 micron aluminum oxide particles dispersed in water.

The $CrO_2$-filled film was next topcoated with approximately 0.4 micron of the Imron® RK801 polyether urethaen exactly as described for the original backside coating above. The final filled film contained approximately 3.27 grams of $CrO_2$ and alkyd binder per square meter. This film was used to make reflex exposures that were developed by aqueous toner dispersions to give excellent copies of the originals as described in previous examples.

The embodiments of the invention in which an exclusive property or privilege is claimed are defined as follows:

1. A composite thermomagnetic recording member comprising a support transparent to light, a stratum of indentations at the surface of said support having a depth of from .05 to 2 mils, said indentations being disposed in a substantially regular pattern at a spacing of from 1/100 to 1/1500 inch, said indentations containing particulate hard magnetic material having a Curie temperature between 25° C. and 500° C. and bound in said indentations, the particles of said hard magnetic material having a maximum dimension in the range of from 0.01 to 10 microns, said hard magnetic material being opaque to said light, said magnetic recording member having a transmission to light of from 10% to 90%.

2. Article of claim 1 in which said indentations are a pattern of substantially equally spaced lines.

3. Article of claim 1 in which said indentations are a pattern of substantially equally spaced dots.

4. Article of claim 1 in which said hard magnetic material has a Curie temperature of 70° C. to 170° C.

5. Article of claim 4 in which said hard magnetic material is acicular chromium dioxide.

6. Article of claim 5 in which said chromium dioxide is magnetically oriented in the plane of the support.

7. Article of claim 6 in which said support is a flexible film.

8. Article of claim 7 in which the recording member has a transmission to light of from 50 to 90%.

References Cited

UNITED STATES PATENTS

| | | | |
|---|---|---|---|
| 2,782,043 | 2/1957 | Andrews | 274—41.4UX |
| 2,906,827 | 9/1959 | Gordon et al. | 274—41.4X |
| 3,164,816 | 1/1965 | Chang et al. | 340—174 |

WILLIAM D. MARTIN, Primary Examiner

B. D. PIANALTO, Assistant Examiner

U.S. Cl. X.R.

274—41.4; 346—74